United States Patent
Robinson, Jr.

(10) Patent No.: US 8,815,382 B2
(45) Date of Patent: Aug. 26, 2014

(54) METHOD AND USE OF ORGANIC AND MINERAL ADMIXTURES FOR EMI AND RADIOACTIVE ISOTOPE SHIELDING OF BUILDING MATERIALS SUCH AS GLASS FIBER WALL COVERINGS, GYPSUM WALLBOARD AND ELECTRICALLY CONDUCTIVE OR RESISTIVE, HIGH PERFORMANCE, HIGH STRENGTH CONCRETE

(75) Inventor: William L. Robinson, Jr., Baltimore, MD (US)

(73) Assignee: U.S. Harves Postal Protection Services Corporation, Baltimore, MD (US)

( * ) Notice: Subject to any disclaimer, the term of this patent is extended or adjusted under 35 U.S.C. 154(b) by 621 days.

(21) Appl. No.: 13/067,917

(22) Filed: Jul. 7, 2011

(65) Prior Publication Data
US 2014/0205745 A1 Jul. 24, 2014

(51) Int. Cl.
*B32B 13/02* (2006.01)
*B05D 7/24* (2006.01)
*B32B 17/08* (2006.01)
*G21F 1/10* (2006.01)

(52) U.S. Cl.
USPC ............... 428/294.7; 427/407.3; 427/415; 442/78; 442/180

(58) Field of Classification Search
USPC ..................................... 428/294.7
See application file for complete search history.

(56) References Cited

U.S. PATENT DOCUMENTS

2005/0087705 A1* 4/2005 Nakatsuka et al. ........ 250/516.1
2007/0298235 A1* 12/2007 Yoshida et al. ............. 428/294.7

* cited by examiner

*Primary Examiner* — Michael Cleveland
*Assistant Examiner* — Francisco Tschen

(57) ABSTRACT

A method is disclosed for the use of an organic admixture composed of a polysaccharide such as hydroxypropylcellulose and a monosaccharide such as ethoxylated methylglucoside and de-ionized water and minerals such as zeolites for electromagnetic; radio and microwave frequency and radioisotope shielding of building materials such as wall liners, gypsum wallboard and high performance, high strength concrete.

3 Claims, No Drawings

METHOD AND USE OF ORGANIC AND MINERAL ADMIXTURES FOR EMI AND RADIOACTIVE ISOTOPE SHIELDING OF BUILDING MATERIALS SUCH AS GLASS FIBER WALL COVERINGS, GYPSUM WALLBOARD AND ELECTRICALLY CONDUCTIVE OR RESISTIVE, HIGH PERFORMANCE, HIGH STRENGTH CONCRETE

BACKGROUND OF THE INVENTION

1. Field of the Invention

This invention relates to a method of increasing the tensile, flexural and compressive strengths and the EMI/RF/Microwave and radioactive isotope shielding of concrete, cement, gypsum or other pozzolan (alumina siliceous) such as fly ash using electroplated nickel oxide or copper coated stainless steel fibers, hydroxypropylcellulose, ethoxylated methylglucoside, petroleum coke powder or graphite and silica fume and non-radioactive alkali metals such as holmium and natural zeolites such as Clinoptilolite as radioactive trapping agents.

2. Discussion of the Related Art

Cement is a widely used building material, but it lacks the ability to shield electromagnetic radiation. As the environment is increasingly sensitive to electronic pollution, the ability of a building to shield electromagnetic radiation is of increasing importance.

There has been a strong demand of late for high-quality and lightweight radioactive isotope shielded building materials such as wall coverings and wallboard.

Stainless steel fibers reinforced concrete (SSRC), a well dispersed mixture of either short or chopped continuous or non-continuous fiber in cement in the range of 0.90 vol. % has been known since the 1970s. SSRC has many outstanding mechanical characteristics which are unsurpassed by conventional reinforced concretes particularly, chemical stability towards strong alkaline environment and long term durability of mechanical strength are a few essential features in the development of SSRC.

Fly ash can be substituted for cement in concrete mixes for global construction of infrastructures saving energy, disposing of waste products, protecting the environment against global warming emissions, improving the quality of concrete and reducing cost. Ultra fine fly ash can be added to silica fume to enhance the strength of concrete.

3. Statement of Need

There is a need for protecting reinforcing steel adding to the longevity of concrete structures by preventing the penetration of waterborne contaminants and chloride-laden liquids that cause the corrosion of reinforcing steel.

There is a need for increased bonding strength and contact resistivity between cement and structural steel or steel fibers.

Because of the developments in electronics technology, there is a need for EMI/RF/Microwave Interference shielding of building materials e.g. gypsum wallboard and concrete particularly in underground vaults containing power transformers and other electronics that are relevant to electric power and telecommunications and for deterring electromagnetic forms of spying.

There is a need for an environmentally friendly way to recycle ashes produced from the industrial combustion of coal and petroleum and the minerals and metals contained therein e.g. selenium, vanadium, nickel and holmium.

There is definitely a need for a way to trap radioactive nuclear fission products (isotopes) e.g. $^{137}Cs$ and $^{90}Sr$ accidentally or intentionally released into the environment.

GENERAL BACKGROUND

Electric utilities in the United States generate over 100 million tons of petroleum coke ash and coal fly ash as a by-product each year. Fly ash in particular is typically disposed of in landfills. Course fly ash ground to approximately 3.8 µm can produce high strength concrete and 25% cement replacement gave the highest compressive strength (100.3 MPa). A replacement of 25% cement will result in a 27% reduction in greenhouse gases produced from production of cement (680 Kg/ton of cement).

The cement industry is responsible for producing 5% of global $CO_2$ emissions; 60% due to decarbonization of non-renewable materials such as limestone and 40% due to heating cement kilns to 1500° C. using non-renewable fossil fuels.

Adding 0.90 vol. % stainless steel fibers (by weight) to cement improves strength by 23% equal to 2-3 times that of non-reinforced concrete. The dominant mechanisms of EM/RF/Microwave shielding for micron size (>100 nm) steel fibers is absorption.

Nickel filaments of diameter 0.4 µm, as made by electroplating 0.1 µm diameter carbon filaments with nickel, have been shown to be particularly effective. They are known as nickel filaments because they are mostly nickel rather than carbon. A shielding effectiveness of 87 dB at 1 GHz has been attained in a polymer-matrix composite containing just 7 vol. % nickel filaments. Nickel is more attractive than copper, partly due to its superior oxidation resistance.

Shielding of 40 dB or more in the magnetic field ranging from 150 kHz to 16 MHz is needed for a 99% EMI block. This degree of shielding effectiveness is sufficient to for the construction of electromagnetic interference structures.

Binding Properties of Calcium Hydroxide or Hydrated Lime ($CaCO_3$) with HPC.

Calcium hydroxide or hydrated lime is the product of the hydration of lime and water:

$$Ca(OH)_2 <\!=\!=\!=\!=\!=\!=\!> CaO + H_2O$$

Lime is a soft, white amorphous powder with alkaline or slightly bitter taste. It has been. shown that lime is solubilised in the presence of sugars and it has been observed in set Portland cements as hexagonal plate crystals (Lea, 1970). Lime reacts with carbon dioxide ($CO_2$) to form calcium carbonate ($CaCO_3$). This reaction which takes place in the presence of moisture is the cause of hardening of high calcium lime mortars.

Binding Properties of HPC with Steel Fiber and Cement

HPC and Ethoxylated methyl glucoside (moisture barrier) binds together at the 1-3' C-Terminal Domain. How does HPC bind to calcium in concrete? In the presence of water calcium located at the N-Terminal Cellulose Binding Domain in HPC will bind to calcium bonds at the 1-4' β calcium bonding sites in cement.

The use of hydroxypropylcellulose or methylcellulose (0.4% to 0.8% by weight of cement) as an admixture in cement paste or concrete was found to increase the shear bond strength with steel reinforcing bar and steel fiber. The bond strength increased with increasing hydroxypropylcellulose or methylcellulose amounts. The contact electrical resistivity between cement and fiber or between concrete and reinforcing bar was not changed by addition of hydroxypropylcellulose or inethylcellulose.

Trapping of Radioactive Fission Products (Isotopes) Using Non-Radioactive Stable Metallic Elements Holmium (houlmiə m/HOHL-mee-ə m) is a chemical element with the symbol Ho and atomic number 67. Part of the lanthanide series, holmium is a relatively soft and malleable silvery-white metallic element, which is stable in dry air at room temperature. A rare earth metal, it is found in the minerals monazite and gadolinite. Holmium has the highest magnetic strength of any element and therefore is used for the pole pieces of the strongest static magnets. Because holmium strongly absorbs nuclear fission-bred neutrons, it is also used in nuclear control rods.

Zeolite chemistry is the distribution of silicon and aluminum atoms among the T sites. According to Lowenstein's Rule, AL-O-AL linkages in zeolitic frameworks are Forbidden. As a result, all aluminate tetrahedra must be linked to four silicate tetrahedra, and in general this is proved to be the case, but recent investigations into Zeolites synthesized at high temperatures have shown non-Lowenstein distributions in Sodalite materials. Aluminum ions are formed by losing three (3) electrons making it neutrally charged. The combination of negatively charged silica and aluminum produces negatively charged ions that will absorb electromagnetic waves. Negative ions are a type of antioxidant present in nature that is reported to react with and break down toxins in the bloodstream.

The range of Si/Al ratios varies between zeolites. ZSM-5 is a high silicate zeolite, whereas zeolite X/Y can be prepared in high silicate forms, or high aluminate forms, but is usually produced with a Si/A1 ratio close to unity with a fully ordered Si—Al distribution over the tetrahedral sites, in accordance with Lowenstein's rule.

The inclusion of aluminum into the zeolite structure has two major effects: An increase in the net negative charge—which are neutralized from protons hydrogen bonded to the lone pairs of the bridging oxygens. These acidic sites play a significant role in the zeolite catalytic activity. The materials become hydrophilic. Zeolites are not only influenced by pH but also they are capable of affecting the solution pH. It was found out that clinoptilolite tends to neutralize the solution by acting as H+ acceptor or H+ donor (Rivera et al., 2000; Ersoy and çelik, 2002). The pH of solution can also affect removal efficiency by affecting the integrity of zeolite. Clinoptilolite is known to partially degrade and lose its ion exchange capacity in alkaline media (Mier et al., 2001). Also, clinoptilolite structure breaks down in highly acidic solutions (Tsitsishvili, 1992). On the other hand, as the solution pH increases, the number of negatively charged sites increases (Benhammou et al., 2005), Clinoptilolite-deionized water suspensions at neutral, acidic and basic pH values exhibited a buffer pH around 9±1. This was also observed by Trgo and Perk (2003) and at all initial pH's examined (2-11) in deionized water-clinoptilolite suspensions pH became stable between 8 and 9. Active adsorbent materials such as zeolites, carbon molecular sieve (CMS), alumina and other porous adsorbent materials and lanthanides such as holmium can be coated onto glass fiber paper. In order to bind adsorbent particles with glass fibers and to have uniform distribution of adsorbent particles, many ingredients and additives such as retention binders may also be added into the coating solution. The final non-woven-fabric sheet (paper) will be comprised of the retention aid, the active adsorbent materials and the organic polymer. A retention aid is any material that enhances the retention of the glass fibers in the wall liner and adsorbents. The retention aid binders such as Alcoa HiQ-40, Alucol or Alumina Sol are added to the slurry to bind the adsorbent particles to the glass fibers in the paper. Through this process, adsorbent particles tend also to be encapsulated by the boelunite binder material. Absorbent materials such as zeolites adsorbent material which includes but is not limited to zeolite type X, zeolite type A, zeolite type Y, ZSM-3, EMT, EMC-2, ZSM-18, ZK5, ZSM-5, ZSM-11, .beta., L, chabazite, offretite, erionite, mordenite, gmelinite, mazzite, clinoptilolite and mixtures of these. Other adsorbents such as activated alumina sol, silica gel, carbon molecular sieves, amorphous aluminosilicate, clay materials and paramagnetic lanthanide metals such as holmium and erbium can also be used.

SUMMARY OF THE INVENTION

Objects of the Invention

The present invention generally relates to a method of producing reinforced blended cement (e.g clinker, synthetic gypsum and petroleum coke powder), plus stainless steel fiber, fly ash and HPC to make high performance concrete for building materials that has increased density, bonding, tensile, flexural and compressive strength.

The present invention also relates to a new application, namely the use of petroleum coke powder and steel fibers as an electrically conductive filler in concrete for electromagnetic interference (EMI) shielding. EMI shielding is in critical demand due to the interference of wireless (particularly radio frequency) devices with digital devices and the increasing sensitivity of electronic devices. Shielding is particularly needed for underground vaults containing transformers and other electronics that are relevant to electric power and telecommunication. It is also needed for deterring electromagnetic forms of spying. The high shielding effectiveness of cement paste containing steel fibers is consistent with its low electrical resistivity. Stainless steel fibers (8 mm diameter) 0.36 vol. % has very low resistivity. The resistivity is 40 Ω cm at 0.78 vol. % steel fibers (8 mm diameter). Hence, steel fibers are effective for passing current. Steel is also much more conductive than carbon. The high conductivity makes steel fibers outstanding for shielding. In spite of the large diameter compared to other shielding materials. In fact, steel fibers (8 mm diameter) at 0.90 vol % reached 71 dB (1.5 GHz).

The highest two values of EMI consisted of shielding effectiveness previously reported in cementmatrix composites are 40 dB, as attained in cement paste containing 1.5 vol. % carbon filaments and 70 dB, attained in cement paste containing 0.72 vol. % stainless steel fibers of diameter 8 mm and length 6 mm.

The present invention also relates to a new application, namely the use of alkali paramagnetic materials such as Holmium or zeolites (natural) or synthetic) dissolved in de-ionized water then coated onto a glass fiber substrates (paper) along with an organic wash coated polymer and used to cover building materials such as wall board and ceiling tiles and panels or as wall liner (covering) for absorption of nuclear fission products such as radioactive isotopes of cesium and strontium.

Principles in Accordance with the Present Invention

In achievement of the above objects it is suggested, that concrete will be reinforced with steel fibers and coal fly ash and the addition of an organic (polysaccharide) admixture e.g. methylcellulose of the invention.

It is also suggested that EMI/RF/Microwave shielding of concrete can be achieved by cross linking or combining cellulose fibers with deflective or absorptive materials such as fly ash containing silica futile (<6 vol. %), coke powder (1.02 vol. %), nickel plated carbon filaments (7 vol. %) or copper coated stainless steel fibers (0.78 vol. %).

It is specifically suggested that EMI/RF/Microwave shielded structural and non-structural building materials can be used for lateral and distress guidance systems in automated highways, bridge pavements and levees.

It is also specifically suggested that a stable trapping agent containing a non-radioactive isotope of the fission product may be negatively charged zeolites such as Clinoptilolite and chabazite, resulting from the replacement of silicon by aluminum in the tetrahedra, interfere positively on the mechanisms of ionic exchanges.

The foregoing discussion discloses and describes merely exemplary embodiments of the present invention. One skilled in the art will readily recognize from such discussion and claims that various changes, modifications and variations can be made therein without departing from the spirit and scope of the invention as defined in the following claims.

What is claimed is:

1. A method for producing building materials, the building materials selected from the group consisting of gypsum wallboard, mineral fiber acoustic ceiling tiles, mineral fiber acoustic panels, PVC laminated gypsum ceiling tiles, fiber glass ceiling panels, fiber glass acoustic panels, ceiling tiles and wall liners; the building materials containing a woven or nonwoven glass fiber paper substrate coated with an aqueous composition comprising a zeolite radiation absorbent acting as a trapping agent and a retention aid binder, the aqueous composition applied at a thickness of 0.001 in - 0.002 in., the method comprising the steps of:
   a) mixing at a ratio of 60-80% radiation absorbing zeolite and 40-20% retention aid binder in DI water at a pH 8-9 and a temperature of 28-30 deg. C. for two minutes to create an aqueous composition, then;
   b) applying the aqueous composition by spraying, dipping or coating onto the glass fiber paper substrate, then,
   c) coating an organic composition over the aqueous composition, the organic composition comprising: hydroxypropylcellulose (HPC) and ethoxylated methyl glucoside (EMG) in 60-40% ratio (HPC:EMG) in DI water (20% vol).

2. The method of producing building materials according to claim 1, in which the zeolite radiation absorbent is selected from the group consisting of zeolites type X, zeolite type A, zeolite type Y, ZSM-3, EMT, EMC-2, ZSM-18, ZKS, ZSM-5, ZSM-11, .beta., L. charbazite, offretite, erionite, mordenite gmelinite, mazzite, clinoptilolite and mixtures of these.

3. The method of producing building materials according to claim 1, in which the retention aid binder is selected from the group consisting of boehmite, Alucol, or Alumina Sol are added to the slurry to bind the absorbent particles to the glass fibers in the paper.

* * * * *